000
United States Patent
McGarry et al.

(10) Patent No.: US 7,586,765 B2
(45) Date of Patent: Sep. 8, 2009

(54) SWITCHED CURRENT POWER CONVERTER WITH REDUCED POWER LOSSES DURING LOW LOAD CONDITIONS

(75) Inventors: Laurence McGarry, Hong Kong (HK); William Lee, Shen Zhen (CN); Owen Jiang, Shenzhen (CN); Horace Liang, Zhaoqing (CN); Lucy Zhong, Meixian (CN)

(73) Assignee: Astec International Limited, Kwun Tong, Kowloon (HK)

( * ) Notice: Subject to any disclaimer, the term of this patent is extended or adjusted under 35 U.S.C. 154(b) by 379 days.

(21) Appl. No.: 11/189,560

(22) Filed: Jul. 26, 2005

(65) Prior Publication Data

US 2007/0025127 A1 Feb. 1, 2007

(51) Int. Cl.
*H02J 1/10* (2006.01)
*G05F 1/00* (2006.01)

(52) U.S. Cl. .................... 363/65; 363/134; 323/272

(58) Field of Classification Search ................ 363/65, 363/16, 210, 24–26, 71, 133, 134; 323/368, 323/271, 272
See application file for complete search history.

(56) References Cited

U.S. PATENT DOCUMENTS

| | | | |
|---|---|---|---|
| 4,050,789 A | 9/1977 | Herbert | |
| 4,148,563 A | 4/1979 | Herbert | |
| 4,150,423 A * | 4/1979 | Boschert | 363/25 |
| 4,258,295 A * | 3/1981 | Siglock | 315/189 |
| 4,665,357 A | 5/1987 | Herbert | |
| 4,845,606 A | 7/1989 | Herbert | |
| 4,916,576 A | 4/1990 | Herbert et al. | |
| 4,942,353 A | 7/1990 | Herbert et al. | |
| 4,978,906 A | 12/1990 | Herbert et al. | |
| 5,014,261 A * | 5/1991 | Shinbashi et al. | 370/220 |
| 5,093,646 A | 3/1992 | Herbert | |
| 5,132,606 A | 7/1992 | Herbert | |
| 5,144,222 A | 9/1992 | Herbert | |
| 5,297,617 A | 3/1994 | Herbert | |
| 5,346,327 A | 9/1994 | Herbert | |
| 5,445,215 A | 8/1995 | Herbert | |
| 5,479,146 A | 12/1995 | Herbert | |
| 5,659,455 A | 8/1997 | Herbert | |
| 5,910,879 A | 6/1999 | Herbert | |
| 5,923,523 A | 7/1999 | Herbert | |
| 5,999,078 A | 12/1999 | Herbert | |
| 6,016,095 A | 1/2000 | Herbert | |
| 6,115,267 A | 9/2000 | Herbert | |
| 6,121,761 A | 9/2000 | Herbert | |
| 6,125,920 A | 10/2000 | Herbert | |
| 6,137,392 A | 10/2000 | Herbert | |
| 6,144,566 A * | 11/2000 | Keller | 363/21.12 |
| 6,232,754 B1 * | 5/2001 | Liebler et al. | 323/272 |

(Continued)

*Primary Examiner*—Jessica Han
*Assistant Examiner*—Emily Pham
(74) *Attorney, Agent, or Firm*—Harness, Dickey & Pierce, P.L.C.

(57) ABSTRACT

A switched current power converter includes an input power source, an output terminal, and a plurality of current stages. Each of the current stages includes a converter coupled to the input power source for providing a current and a switch circuit that selectively couples the current in such current stage to the output terminal. A control circuit decouples the input power source from the current stage converters upon detection of a low load condition. Optionally, the power converter includes a low load circuit responsive to the control circuit that selectively couples current to the output terminal during the low load condition.

19 Claims, 4 Drawing Sheets

U.S. PATENT DOCUMENTS

| | | | |
|---|---|---|---|
| 6,348,848 B1 | 2/2002 | Herbert | |
| 6,549,411 B1 | 4/2003 | Herbert | |
| 6,578,253 B1 | 6/2003 | Herbert | |
| 6,696,823 B2* | 2/2004 | Ledenev et al. | 323/272 |
| 6,734,778 B2 | 5/2004 | Herbert | |
| 6,838,863 B2* | 1/2005 | Hazucha et al. | 323/282 |
| 6,897,641 B1 | 5/2005 | Herbert | |
| 6,963,497 B1 | 11/2005 | Herbert | |
| 6,966,357 B1 | 11/2005 | Herbert | |
| 6,979,982 B2* | 12/2005 | Herbert | 323/272 |
| 6,981,878 B1 | 1/2006 | Herbert | |
| 6,992,520 B1 | 1/2006 | Herbert | |
| 6,992,906 B1 | 1/2006 | Herbert | |
| 7,023,317 B1 | 4/2006 | Herbert | |
| 7,071,807 B1 | 7/2006 | Herbert | |
| 7,075,802 B2* | 7/2006 | Yamashita | 363/21.12 |
| 7,098,638 B1 | 8/2006 | Herbert | |
| 7,116,014 B1 | 10/2006 | Herbert | |
| 7,119,648 B1 | 10/2006 | Herbert | |
| 7,136,285 B1 | 11/2006 | Herbert | |
| 7,139,180 B1 | 11/2006 | Herbert | |
| 7,170,764 B2* | 1/2007 | Vinciarelli | 363/65 |
| 7,212,419 B2* | 5/2007 | Vinciarelli | 363/65 |
| 7,414,868 B2* | 8/2008 | Lee et al. | 363/65 |
| 2005/0237036 A1* | 10/2005 | Nguyen et al. | 323/247 |
| 2006/0285370 A1* | 12/2006 | Lee et al. | 363/25 |

* cited by examiner

SWITCHED CURRENT POWER CONVERTER WITH REDUCED POWER LOSSES DURING LOW LOAD CONDITIONS

FIELD OF THE INVENTION

The present invention relates to power supplies including switched current power converters having low circulating current losses during low load conditions.

BACKGROUND OF THE INVENTION

A wide variety of electric power supplies have been developed for use with integrated circuit and other devices. Some common examples include DC/DC converters and VRMs. In many applications, including those utilizing low voltage digital circuitry such as microprocessors, the power supply must provide a fast dynamic response to changes or variations in the load or load requirements.

A typical DC/DC converter converts a DC voltage supplied from one or more power sources to a desired voltage. This can be accomplished using switching devices that selectively couple one or more current sources either to the power supply output or to a return. By dynamically controlling the on/off timing of each switching device, the number of current sources supplying current to the output, and thus the amount of output current supplied to the load, can be dynamically controlled. This is particularly useful when the load current demand varies and the output voltage is desired to remain within a particular range or a nominal value.

When the load on the output becomes low, the amount of current switched to the return (referred to as circulating current) increases. These circulating currents typically remain active and thus available for dynamic switching from the return to the output in response to an increase in the load.

As recognized by the inventors hereof, one disadvantage of many known power supplies is the amount of power that is consumed or wasted by circulating current. As such, the inventors have identified a need for a power supply having reduced low load power losses while maintaining a satisfactory dynamic response to changing load requirements.

SUMMARY OF THE INVENTION

According to one aspect of the present invention, a switched current power converter includes an input power source, an output terminal, and a plurality of current stages. Each current stage includes a converter coupled to the input power source for providing a current and a switch circuit for selectively coupling the current in such current stage to the output terminal. The converter also includes a control circuit for decoupling the input power source from the current stage converters upon detection of a low load condition.

According to another aspect of the invention, a switched current power converter includes an input power source, an output terminal, a transformer, and a plurality of branch circuits. The transformer has at least one primary coupled to the input power source and a plurality of secondaries. Each branch circuit is coupled to one of the transformer secondaries and includes a switch circuit for selectively coupling current in such branch circuit to the output terminal. The converter also includes a control circuit provides for disabling the transformer upon detecting a low load condition.

According to yet another aspect of the invention, a switched current power converter includes an input power source, a transformer and a plurality of branch circuits. The transformer has at least one primary coupled to the input power source and a plurality of secondaries. Each branch circuit is coupled to one of the transformer secondaries and includes a switch circuit for selectively coupling current in such branch circuit to one of an output terminal and ground. The converter further includes a control circuit for detecting a low load condition, and a low load circuit responsive to the control circuit for selectively coupling current to one of the output terminal and ground during the low load condition.

Further aspects of the present invention will be in part apparent and in part pointed out below. It should be understood that various aspects of the invention may be implemented individually or in combination with one another. It should also be understood that the detailed description and drawings, while indicating certain exemplary embodiments of the invention, are intended for purposes of illustration only and should not be construed as limiting the scope of the invention.

BRIEF DESCRIPTION OF THE DRAWINGS

FIG. 2(*a*) is a block diagram of a switched current power converter according to another embodiment of the invention.

FIG. 2(*b*) is a block diagram of a switched current power converter according to a further embodiment of the invention.

FIG. 2(*c*) is a block diagram of a switched current power converter according to yet another embodiment of the invention.

Like reference symbols indicate like elements or features throughout the drawings.

DETAILED DESCRIPTION OF EXEMPLARY EMBODIMENTS

Figure 1:
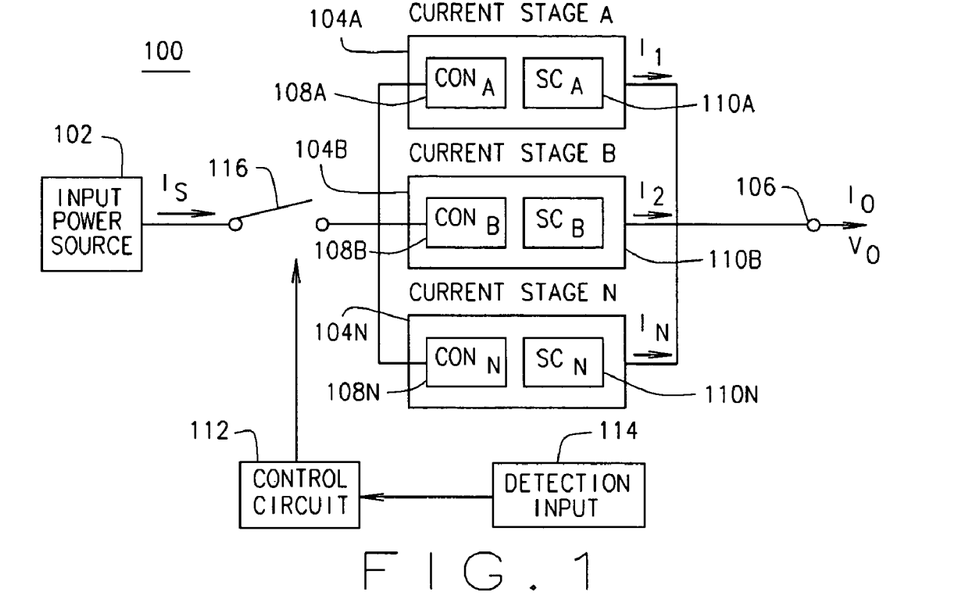
FIG. 1 is a block diagram of a switched current power converter according to a one embodiment of the invention.

A switched power converter according to one exemplary embodiment of the present invention is illustrated in FIG. 1 and indicated generally by reference numeral 100. As shown in FIG. 1, the converter 100 includes an input power source 102 for providing a supply current $I_s$. Additionally, the converter 100 includes several current stages 104A, 104B, . . . 104N. Each current stage 104 includes a converter 108A, 108B, . . . 108N coupled to the input power source 102 for providing a current $I_1, I_2, \ldots I_N$, and a switch circuit 110A, 110B, . . . 110N for selectively coupling the current of each current stage to an output terminal 106, and thus to a load (not shown) coupled to the output terminal 106. The converter 100 further includes a control circuit 112 for decoupling the input power source 102 from the current stage converters 108 upon detecting a low load condition.

Although FIG. 1 illustrates the input power source 102 coupled to the converters 108 via a switch 116 under control of the control circuit 112, it should be understood that this is for illustrative purposes and that a wide variety of switching and other devices can be employed for coupling and/or decoupling the input power source 102 from one or more of the current stage converters 108.

The low load condition may be defined as desired for any given application of the invention. In some embodiments, the low load condition is deemed established when the output current $I_o$ is approximately 10% or less of the maximum rated output current of the converter 100. However, other percentages and/or parameters can be employed to define a low load condition. Further, multiple low load conditions (e.g., corresponding to multiple low load current levels) may be defined and implemented in any given application without departing from the scope of the present invention.

As shown in FIG. 1, the control circuit 112 may include one or more inputs 114 for detecting the low load condition. By way of example, the input 114 can be coupled to an external source (e.g., a sensor, a switch, a signal processing circuit, an operator input, the load, etc.) that provides a logic signal to the control circuit 112 when the low load condition is established. Alternatively, the control circuit 112 may itself determine when a low load condition is established by detecting one or more voltage or current levels via one or more inputs 114. The control circuit 112 may include a logic circuit for this purpose, as further explained below.

In some embodiments, the control circuit 112 is also configured for controlling operation of the switch circuits 110 to control the amount of output current $I_o$ supplied to the output terminal 106 and thus to the load. As apparent to those skilled in the art, the output current $I_o$ is the sum of the currents selectively coupled to the output terminal 106 by the switch circuits 110.

The input power source 102 can be any suitable power source including a constant current or voltage source, by way of example. Further, while not shown in FIG. 1, one or more capacitors can be coupled to the output terminal 106 for smoothing the output voltage $V_O$ and/or output current $I_o$.

Figure 2A:
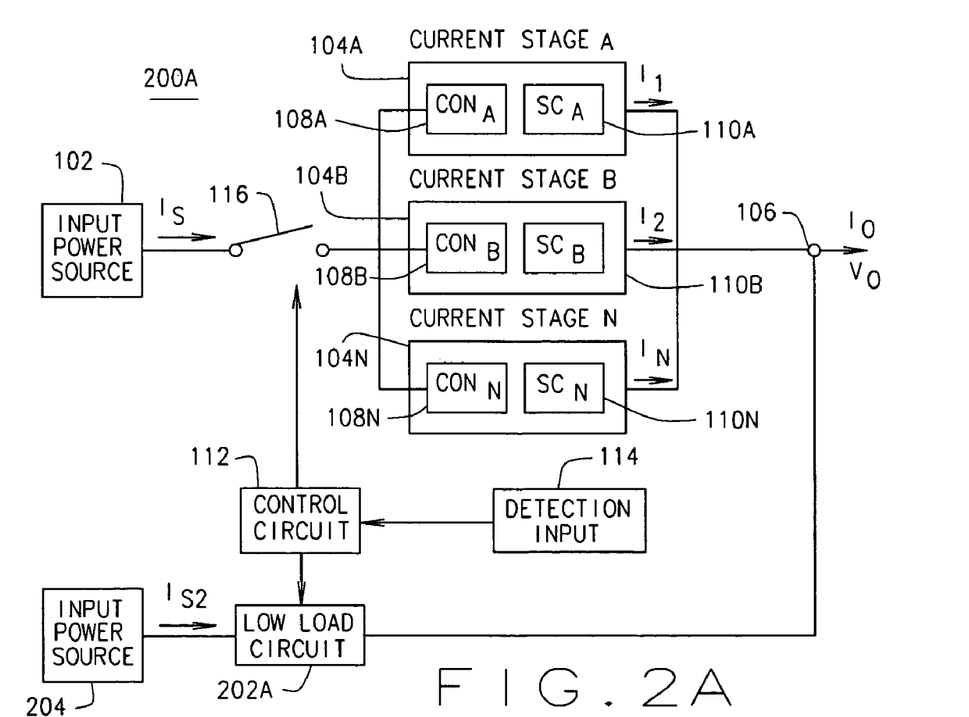

FIG. 2(a) illustrates a switched current power converter 200A according to another embodiment of the invention. As shown in FIG. 2(a), the converter 200A includes a low load circuit 202A and an input power source 204 for providing a supply current $I_{S2}$ to the low load circuit 202A. During a low load condition, the control circuit 112 decouples the input power source 102 from the current stage converters 108, and the low load circuit 202A responds to the control circuit 112 by switching current supplied by the power source 204 to the output terminal 106 or ground (not shown) as necessary.

Figure 2B:
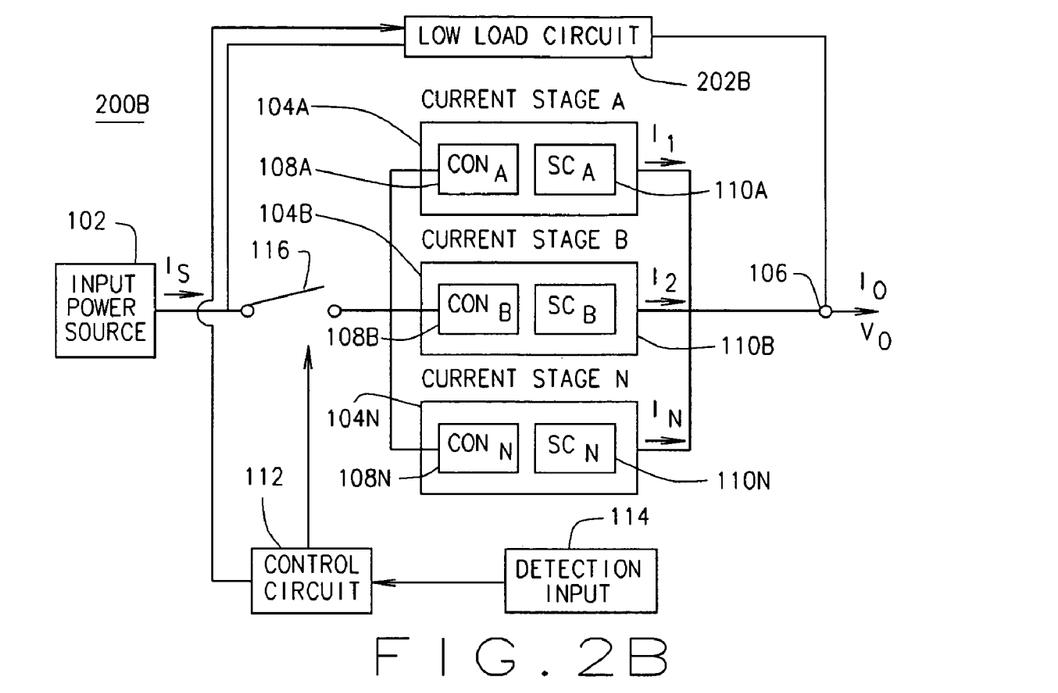

In an alternative embodiment, illustrated by FIG. 2(b), a low load circuit 202B, during a low load condition, couples supply current $I_s$ to the output terminal 106 or ground (not shown) as necessary.

Figure 2C:
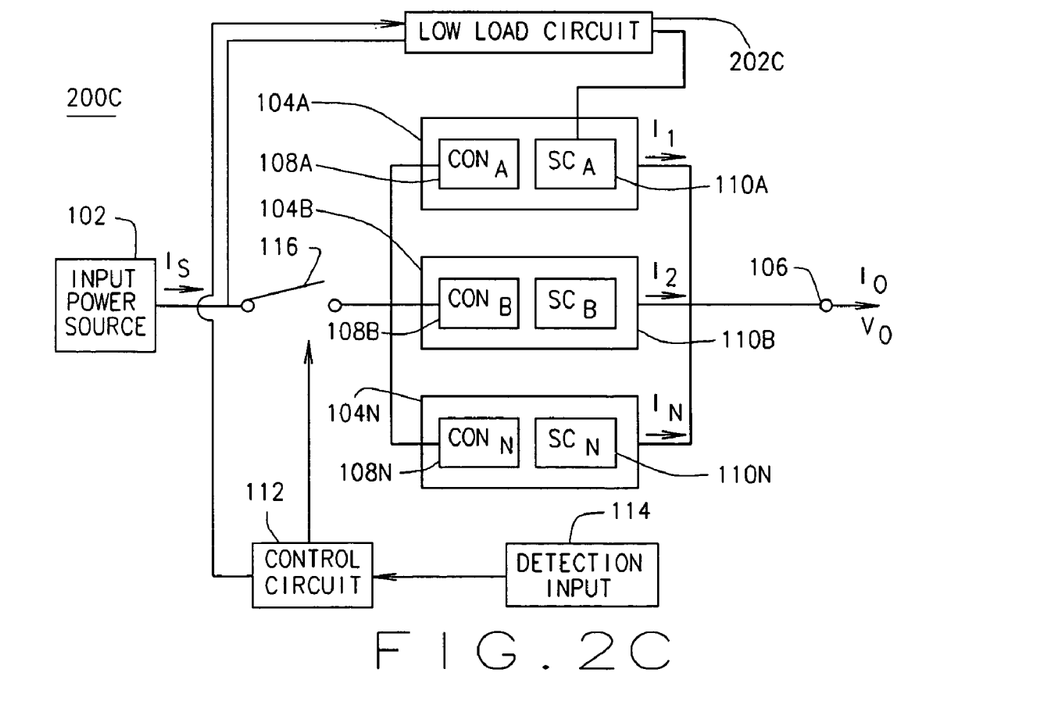

In yet another alternative embodiment, illustrated by FIG. 2(c), a low load circuit 202C, during a low load condition, couples supply current $I_s$ to switch circuit 110A for selectively coupling current to the output terminal 106.

Figure 3:
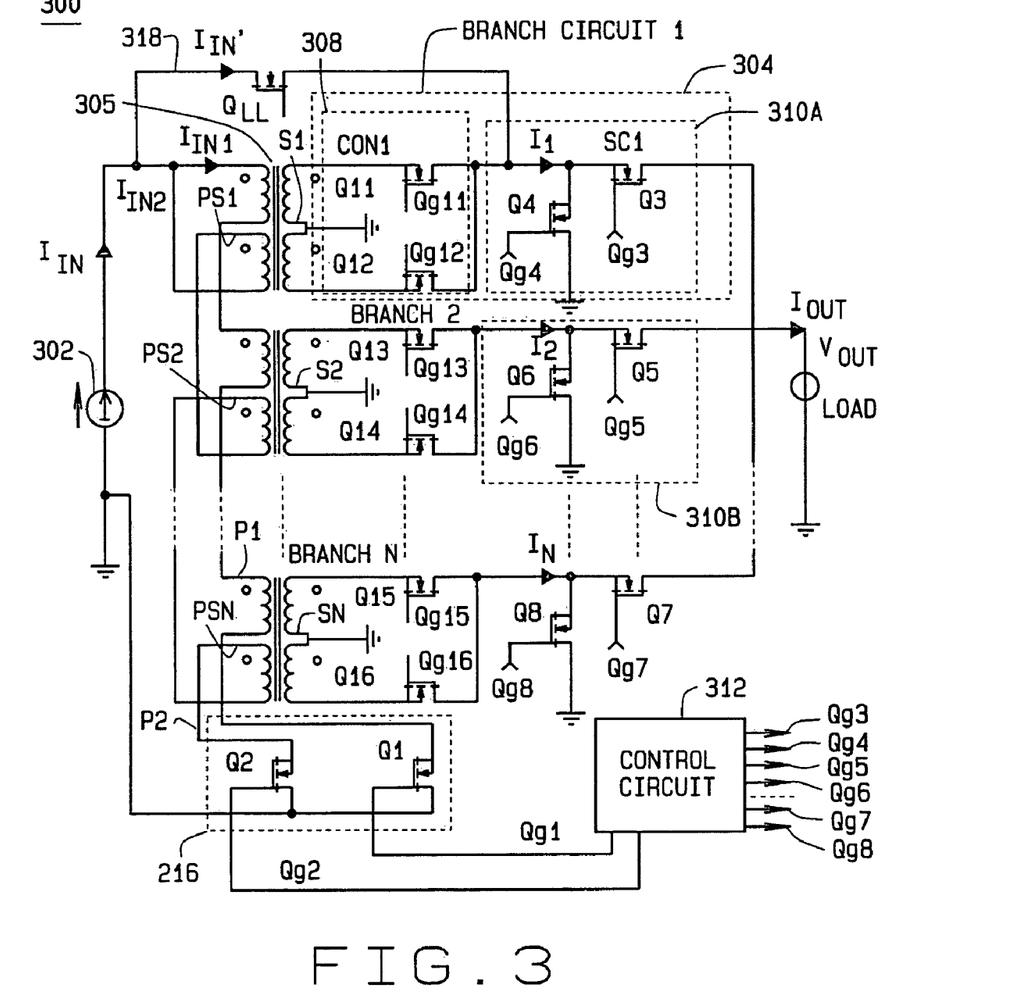
FIG. 3 is an exemplary circuit implementation of the converter of FIG. 2(*c*).

FIG. 3 illustrates an exemplary circuit implementation of the converter of FIG. 2(c) indicated generally by reference numeral 300. As shown in FIG. 3, the converter includes an input power source 302 (e.g. a current source) for energizing a transformer 305 having two primaries P1, P2, and multiple secondaries S1, S2, . . . Sn. The primaries P1, P2 each couple a portion lin1, lin2, respectively, of the input current $I_{IN}$ to a plurality of branch circuits 304 for producing multiple branch currents I1, I2, . . . , In. Each branch circuit 304 includes a converter 308 and a switch circuit 310 for selectively coupling its associated branch current I1, I2, . . . , In to an output terminal 306 of the converter 300. The converter 300 further includes a control circuit 312 for controlling, among other things, operation of the switch circuits 310.

The control circuit is configured to selectively decouple the input power source 302 from all of the secondaries S1, S2, . . . Sn during a low load condition, as further explained below. Similar to the control circuit 112 of FIGS. 1, 2(a)-(c), the control circuit 312 includes one or more inputs 314 for detecting the low load condition.

In the embodiment of FIG. 3, the primaries P1, P2 include multiple primary segments PS1, PS2, . . . , PSn that are each coupled to a different one of the secondaries S1, S2, . . . Sn. Further, each secondary, S1, S2, . . . Sn has a center tap connected to ground and two terminals each connected to one of the branch circuits 304.

During normal operation of the converter 300 (i.e. when the converter is not operating in a low load condition), each primary winding segment PS1, PS2, . . . , PSn is energized by the input currents lin1, lin2 under the control of a push-pull circuit 316. In the embodiment of FIG. 3, the push-pull circuit 316 includes FET switching transistors Q1 and Q2 to alternately energize the primaries P1, P2 in response to control signals Qg1 and Qg2, respectively, from control circuit 312. During such operation, the transistors Q1 and Q2 operate as a synchronous push-pull switching circuit for providing a complementary square wave current signal to the primaries P1, P2. Typically, the control signals Qg1, Qg2 each have a 50% duty cycle such that each transistor Q1, Q2 is active 50% of the time. Thus, when Q1 is conducting (on), Q2 is non-conducting (off), and when Q2 is conducting, Q1 is non-conducting. In this manner, the transformer 305 couples power from the input power source 302 to each of the branch circuits 304 during normal operation of the converter 300.

More specifically, and using Branch Circuit 1 in FIG. 3 as an example, when primary P1 conducts current, switching transistor Q11 is on and provides a substantially constant current $I_1$ to the switch circuit 310A. Alternately, when primary P2 conducts current, switching transistor Q12 is on and provides the substantially constant current $I_1$ to the switch circuit 310A. Thus, control signals Qg11 and Qgl2 are switched on and off in synchronization with the control signals Qg1, Qg2 for the push-pull circuit 316. Further, the current I1 is selectively coupled to either the output terminal 306 (and thus the load) via switching transistor Q3 and control signal Qg3, or to ground via switching transistor Q4 and control signal Qg4. When current I1 is switched to ground, the current I1 is a circulating current and reduces the operating efficiency of the converter 300. As shown in FIG. 3, the control signals for the branch circuits 304, as well as the control signals for the push-pull circuit 316, are provided by the control circuit 312.

During a low load condition, control circuit 312 deactivates the push-pull circuit 316 and activates the low load circuit (shown generally by reference numeral 318). During such time, the low load circuit 318 effectively bypasses each primary winding segment PS1, PS2, . . . , PSn, converter 308 and switch circuit 310, except for switch circuit 310A. In this manner, the control circuit 312 selectively decouples the input power source 302 from each branch circuit 304 (with the exception of the switch circuit 310A of Branch Circuit 1) and couples the current $I_{IN}$ from power source 302 to the low load circuit 318 (shown as $I_{IN'}$). As a result, there are no circulating currents, and thus no circulating current losses, in any of the branch circuits except for possibly Branch Circuit 1 (where the current I1 may be successively switched between the output terminal 306 and ground as necessary to provide the required load current during the low load condition).

In the embodiment of FIG. 3, the low load circuit 318 includes a FET switching transistor $Q_{LL}$ and switch circuit 310A. When activated, $Q_{LL}$ feeds current $I_{IN'}$ to the switch circuit 310A, which selectively couples the current (shown as I1) to either the output terminal 306 (and thus the load) via switching transistor Q3 and control signal Qg3, or to ground via switching transistor Q4 and control signal Qg4.

Although the low load circuit is shown in FIG. 3 as coupled between the input power source 302 and switch circuit 310A, it may alternatively be coupled with another switch circuit, including for example, switch circuit 310B.

Additionally, the substantially constant currents I1, I2, . . . , In that are selectively coupled to the output terminal 306 by the switch circuits 310 may have the same value or different values, as necessary or desired for any given application of the invention.

Figure 4:
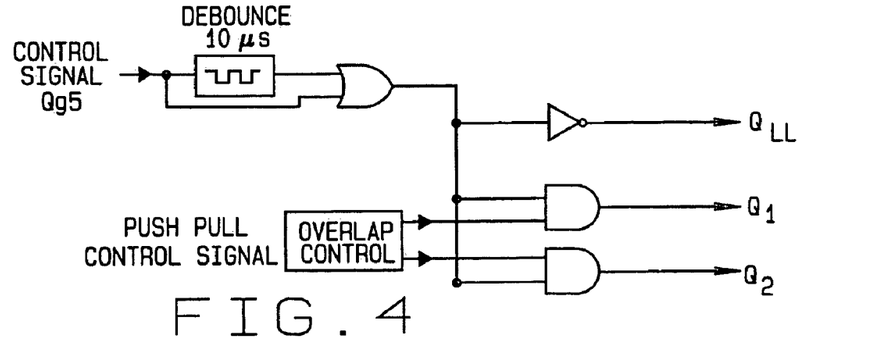
FIG. 4 is a block diagram of an overlap control circuit for driving the push-pull and low load circuits of FIG. 3.

FIG. 4 illustrates an exemplary implementation of a portion of the control circuit 312 which produces the control signals for Qg1, Qg2, and $Qg_{LL}$ for the push-pull circuit 316 and low load circuit 318, respectively. In the exemplary embodiment of FIG. 4, the control signal Qg5 is used to switch the push-pull circuit 316 "ON" and low load circuit 318 "OFF". or vice versa.

Figure 5:
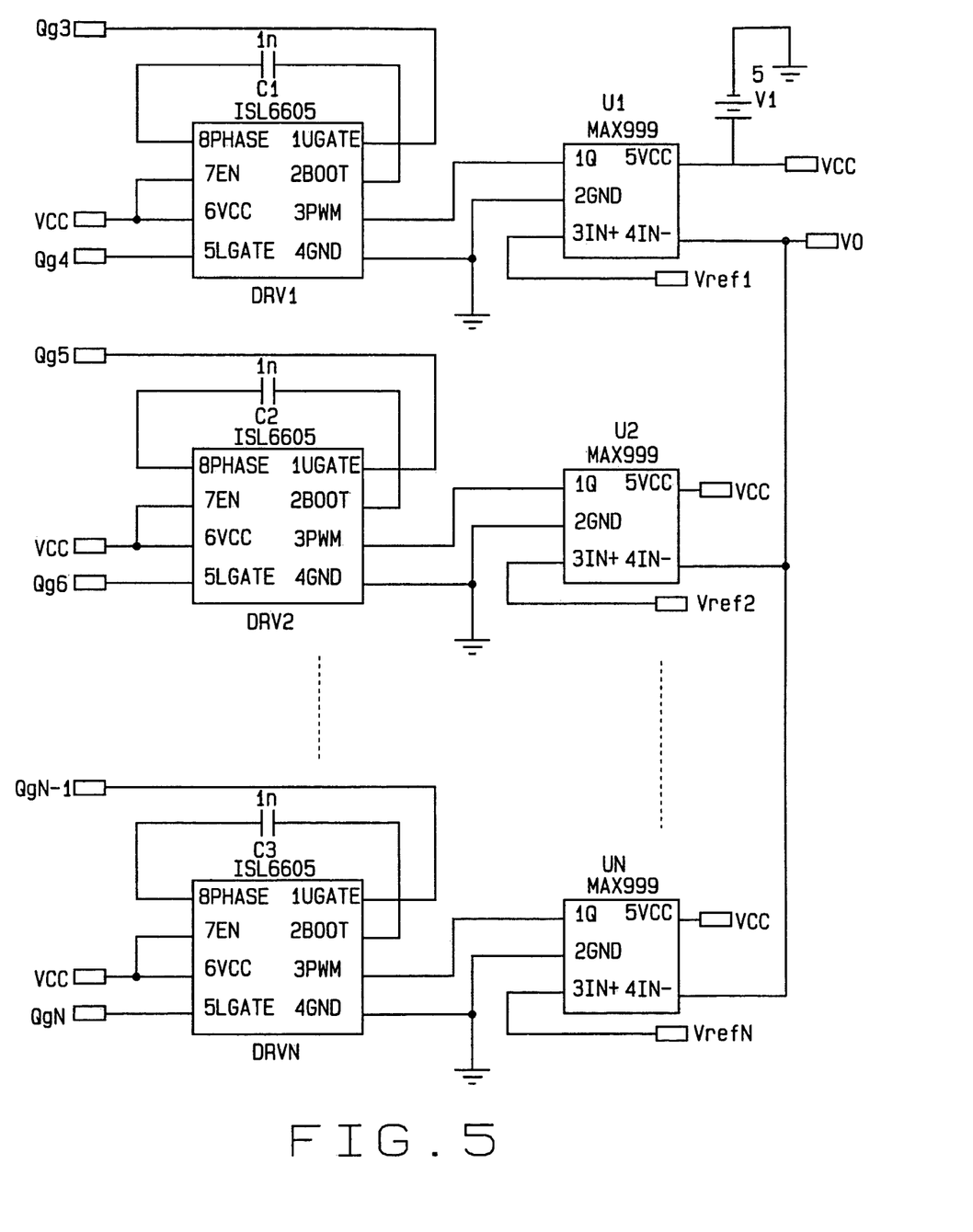
FIG. 5 is a partial circuit diagram of the control circuit shown in FIG. 3.

FIG. 5 illustrates an exemplary implementation of a portion of the control circuit 312 which produces the control signals Qg3-Qg8 provided to the switch circuits 310. In this embodiment, comparators U1-UN compare the output voltage, Vo, to a series of scaled reference voltages Vref1-VrefN to selectively switch the output state of drive signal circuits DRV1-DRVN, and thus the state of control signals Qg3-QgN.

In one application of the present invention, a switched current power converter is required to provide a maximum rated output current of one hundred amperes (100A). In this particular embodiment, the input power source is a ten amp constant current source (e.g., a modified buck converter) selectively coupled to ten branch circuits, with each branch circuit capable of providing ten amps of current to the output terminal. In addition, this embodiment includes a low load circuit capable of providing ten amps of current to the output terminal. During normal operation of this particular converter, nine of the ten branch circuits are usually fully on or fully off as necessary to provide additional load current in ten amp increments. The other branch circuit is pulse width modulated as necessary to provide between zero and ten amps of additional current to the output terminal. For example, if the load current demand during normal operation is twenty-five amps, two of the branch circuits are fully on (each providing ten amps of current to the output terminal), one of the branch circuits is switched on 50% of the time (to thereby provide five amps of current to the output terminal), and the remaining branch circuits are fully off.

Under low load conditions of this particular converter, for example, less than 10% of maximum rated output current, branch circuits are usually fully off, and the low load circuit is pulse modulated as necessary to provide the load current.

It should be understood, however, that the selection of the input power source, the number of branch circuits, the low load circuit, the maximum rated output current, the amount of current provided by each branch circuit, the manner in which the branch circuits are switched and controlled to provide the desired output current, the low load condition, and other implementation details can be varied as necessary or desired for any given application of the present invention.

When describing elements or features of the present invention or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the invention. Accordingly, all matter contained in the above description or shown in the accompanying drawings should be interpreted as illustrative and not in a limiting sense.

What is claimed is:

1. A switched current power converter comprising:
   at least one constant current source;
   a transformer having at least one primary coupled to the at least one constant current source and a plurality of secondaries;
   a plurality of branch circuits each coupled to one of the transformer secondaries, each branch circuit including a switch circuit for selectively coupling current in such branch circuit to one of an output terminal and ground;
   a control circuit for detecting a low load condition; and
   a low load circuit responsive to the control circuit for selectively coupling current from the at least one constant current source to one of the output terminal and ground during the low load condition.

2. The switched current power converter of claim 1 wherein the control circuit is configured to disable the transformer during the low load condition.

3. The switched current power converter of claim 2 wherein the control circuit is configured to couple the at least one constant current source to the low load circuit and the low load circuit is configured to selectively couple current from the at least one constant current source to one of the output terminal and ground during the low load condition.

4. The switched current power converter of claim 3 further comprising a push-pull circuit coupled to the at least one primary and the at least one constant current source, the control circuit disabling the push-pull circuit and the transformer during the low load condition.

5. The switched current power converter of claim 4 wherein the current in each branch circuit is substantially the same when the push-pull circuit and the transformer are active.

6. The switched current power converter of claim 4 wherein the control circuit is configured to decouple the at least one constant current source from the low load circuit, and for activating the push-pull circuit and the transformer, when the low load condition has ended.

7. The switched current power converter of claim 3 wherein the control circuit is configured to detect the low load condition by detecting when an output current of the power converter is below a predetermined current value.

8. The switched current power converter of claim 3 wherein the low load circuit comprises the switch circuit of at least one of the branch circuits.

9. The switched current power converter of claim 8 wherein the low load circuit comprises the switch circuit of only one of the branch circuits.

10. The switched current power converter of claim 1 wherein the at least one constant current source includes a first constant current source and a second constant current source, first constant current source coupled to the primary, the low load circuit responsive to the control circuit for selectively coupling current from the second constant current source to one of the output terminal and ground during the low load condition.

11. The switched current power converter of claim 1 wherein the at least one constant current source includes a buck converter.

12. The switched current power converter of claim 1 wherein the at least one constant current source is the only input power source of the power converter.

13. The switched current power converter of claim 1 wherein the low load condition is approximately 10% of full load.

14. A switched current power converter comprising:

a constant current source;

a transformer having at least one primary coupled to the constant current source and a plurality of secondaries;

an output terminal;

a plurality of branch circuits each coupled to one of the transformer secondaries, each branch circuit including a switch circuit for selectively coupling current in such branch circuit to the output terminal;

a control circuit for disabling the transformer upon detecting a low load condition; and a low load circuit responsive to the control circuit for selectively coupling current from an input power source to the output terminal during the low load condition.

15. The switched current power converter of claim 14 wherein the low load circuit is configured to selectively couple current from the constant current source to the output terminal during the low load condition.

16. The switched current power converter of claim 15 wherein the low load circuit includes the switch circuit of at least one of the branch circuits.

17. A switched current power converter comprising:

at least one constant current source;

an output terminal;

a plurality of current stages, each current stage including a converter coupled to the at least one constant current source for providing a current and a switch circuit for selectively coupling the current in such current stage to the output terminal;

a control circuit for decoupling the at least one constant current source from all of the current stage converters upon detecting a low load condition; and a low load circuit responsive to the control circuit for selectively coupling current from the at least one constant current source to the output terminal during the low load condition.

18. The switched current power converter of claim 17 wherein the low load circuit includes at least one of the current stage switch circuits.

19. The switched current power converter of claim 17 wherein each converter is configured to provide a constant current.

* * * * *

UNITED STATES PATENT AND TRADEMARK OFFICE
CERTIFICATE OF CORRECTION

| | |
|---|---|
| PATENT NO. | : 7,586,765 B2 |
| APPLICATION NO. | : 11/189560 |
| DATED | : September 8, 2009 |
| INVENTOR(S) | : McGarry et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 674 days.

Signed and Sealed this

Twenty-first Day of September, 2010

David J. Kappos
*Director of the United States Patent and Trademark Office*